July 28, 1970 H. E. CLUPPER 3,521,801

PUNCHED TAPE DRIVE AND CONTROL SYSTEM

Filed April 9, 1968

INVENTOR
HAROLD E. CLUPPER
BY Maurice J. Lombard
ATTORNEY

United States Patent Office 3,521,801

Patented July 28, 1970

3,521,801

PUNCHED TAPE DRIVE AND CONTROL SYSTEM

Harold E. Clupper, Fort Wayne, Ind., assignor to International Telephone and Telegraph Corporation, Nutley, N.J., a corporation of Delaware Filed Apr. 9, 1968, Ser. No. 719,920
Int. Cl. B65h *17/18*
U.S. Cl. 226—95 10 Claims

ABSTRACT OF THE DISCLOSURE

A drive system operated by pneumatic fluid which forces a tape into a predetermined recess in a drive housing, which recess is shaped to provide the proper amount of tape drive. Adjacent input and output brake cavities in the housing cooperate with the recess to provide the tape movement.

BACKGROUND OF THE INVENTION

In general this invention relates to a system for handling and reading a tape and more particularly to a pneumatic drive system for advancing and reading a paper, plastic, or metal based tape which is used to store information.

One of the advantages of this driving arrangement is that it utilizes no rotating parts which eliminates the wear and breakdown inherent in all rotating tape reading apparatus. Another important advantage of this arrangement is that the driving, tensioning and braking of the tape is applied to the whole tape and not just to the drive sprocket holes as in known arrangements. Still another important advantage of this invention is that the output is compatible with fluidic elements, and as such, this invention is very useful with many pneumatic logic systems now and potentially in use.

SUMMARY OF THE INVENTION

It is therefore an object of this invention to provide a tape drive utilizing no rotating parts.

Another object of this invention is to provide an arrangement for driving a tape wherein the driving, tensioning and braking is applied to the whole tape.

Still another object of this invention is to provide a pneumatic driving system for advancing a paper, plastic, or metal based tape past a reading position.

According to the broader aspects of this invention an arrangement is provided which operated by pneumatic fluid pressure to force a tape into a predetermined recess in the drive housing, the recess being shaped to provide the proper amount of tape advancement, and means are included to provide a reflex to the tape driven into the recess so as to assist in the tape advancement.

A feature of this invention is that it operates through the use of air pressure to force a punched tape into a predetermined recess in a drive housing. The drive housing includes input and output brake cavities which cooperate with said recess to provide the tape movement.

Another feature of this invention is to provide Mylar piston strips which provide the reflex for the punched tape which has been driven into the recess.

BRIEF DESCRIPTION OF THE DRAWINGS

The arrangement according to the invention will be more easily understood if the following description is taken in connection with the accompanying drawings in which.

DESCRIPTION OF THE PREFERRED EMBODIMENT

Figures 1, 2:
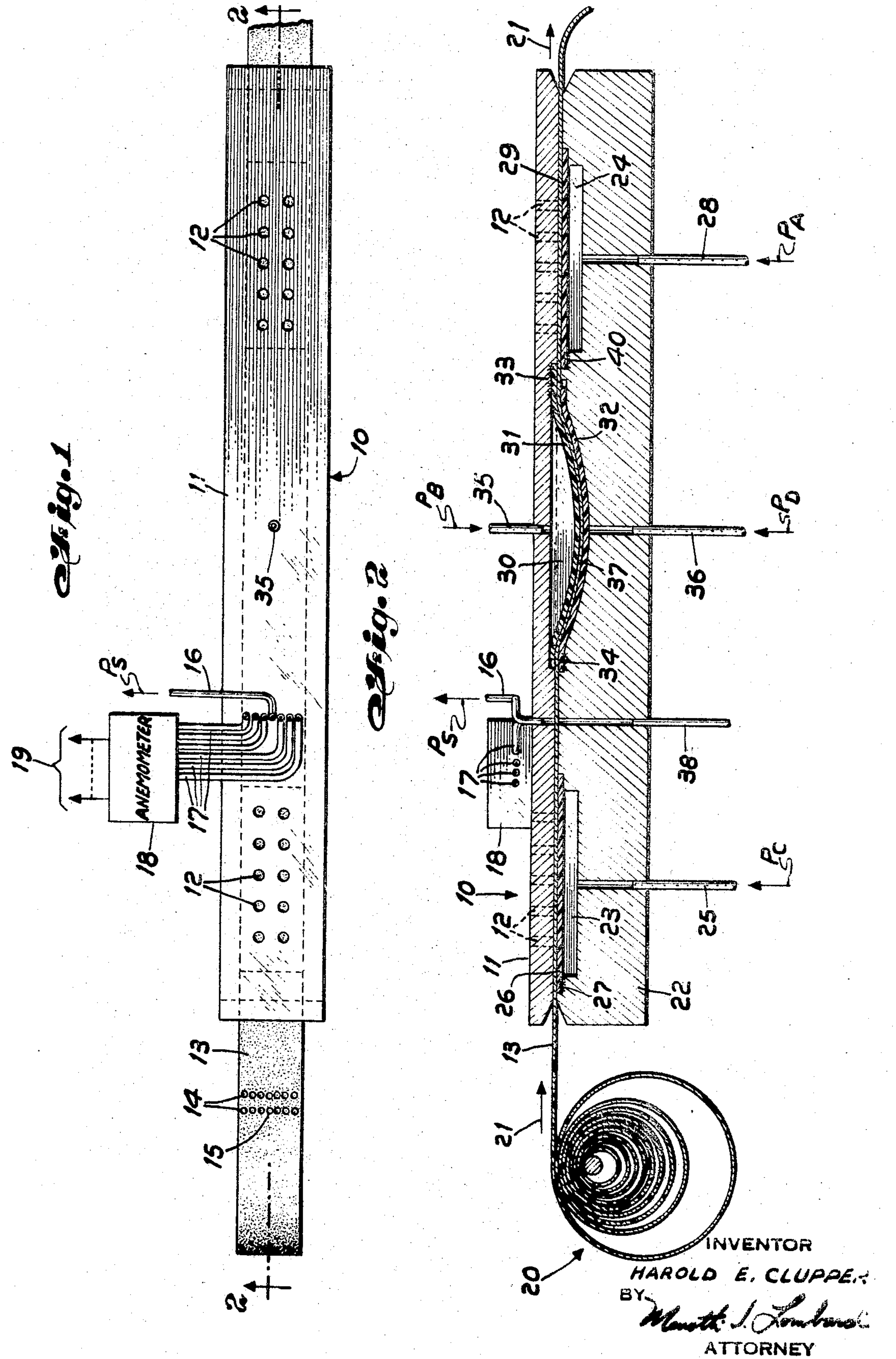
FIG. 1 is a top view of the arrangement according to the invention.
FIG. 2 is a cross-sectional view of the arrangement taken along line 2—2 of FIG. 1.

Referring now to FIG. 1, there is shown a drive housing 10 having a top portion 11 containing vent holes 12. The tape 13 having punched holes 14 and a drive sprocket hole 15 is passed through drive housing 10. A sprocket output signal $P_s$ is derived from tubing 16 and is utilized to serve the timing function as hereinafter described. The remaining tubing 17 is utilized to read the punched holes 14 and couple a pneumatic fluid to a detecting device 18 to produce an output 19.

In the case where air is utilized as the fluid, then an anemometer 18 could be used to measure the velocity of a stream of air and provide a binary output in response to digital pressure signals to produce a suitable electrical output 19 for driving standard electronic elements. The output 19 of the anemometer could be a function of air flow or non-air flow according to the punches in the tape. The anemometer approach is not intended to limit the means for producing an electrical output from tubes 17, since diaphragm operated switches would also be adapted to this arrangement to provide the readout function. The outputs could also be connected directly to a pneumatic logic system. Whenever readout system is utilized, the basic system remains the same.

Referring now to FIG. 2, a punched tape roll 20 is shown moving in the direction indicated by arrows 21. The drive housing 10 is comprised of a top portion 11 and a bottom portion 22. Within the bottom portion 22 there is formed an input brake cavity 23 and an output brake cavity 24. To cavity 23 there is coupled a tube 25 which is used to couple the source of air to cavity 23. In addition, cavity 23 contains strip 26 which is fixed at point 27 (indicated by X). This strip, for example, is a 3 mil Mylar strip which maintain a smooth path for tape 13 through the drive housing and which serves to seal cavity 23 from leakage that would otherwise result through holes 14, 15.

The output brake cavity 24 is also connected by a tube 28 to an air source and contains a strip 29 which is fixed at point 30. Similarly, this strip is a 3 mil Mylar strip located as shown.

Between the input and output cavities is a predetermined recess 30, within this recess are piston strips 31 and 32. Piston strip 31 is fixed at point 33 and piston strip 32 is fixed at point 34. The piston strips act in response to the pressure supplied by tubing 35 and 36 which respectively connect the recess 30 to a source of pressure. A drive loop 37, in response to the pressure applied to tube 35, is formed in the predetermined recess 30 which is shaped to provide as hereinafter described the proper amount of tape drive. The Mylar piston strips within the recess are used to provide a reflex to the tape to facilitate the tape movement.

Located between the input brake cavity 23 and the recess 30 is the sprocket signal output tubing 16 which is connected by tubing 38 to a source of pressure. This is also the position of the reading tube 17 as indicated in FIG. 1, however, the exact location within the housing of the reading means is within the discretion of the designer.

The sequence of operation for reading and advancing the punched tape is as follows. A pressure signal $P_A$ is received via coupling 28 into cavity 24 to clamp that portion of the tape in its position of output brake cavity 24. Following this operation a pressure signal is received at $P_B$ to cause the drive loop 37 to be formed within recess 30 under pressure from piston 31. The reading is then performed and a sprocket output signal $P_S$ is delivered during the reading of the data. The sprocket output signal is then used to determine when the pressure signal $P_C$ is applied via coupling 25 to input brake 23, to clamp that portion of the tape at input brake cavity 23. After the clamping the tape at input brake 23, an advance tape pressure signal $P_D$ is coupled via 36 to remove the drive loop 37, which results in the advancement of the tape in the direction of arrow 21. The pressure $P_A$ has been removed from output brake cavity 24 so that advancement of the tape in the direction of arrow 21 is possible.

Following the movement of the tape, a pressure signal is then again received at $P_A$ via coupling 28 to clamp the tape in a fixed position and the cycle is again repeated. This cycle may be summarized as: clamping the tape at the output brake, forming the drive loop 37, reading the tape, providing a sprocket output signal, clamping the tape at the input brake, releasing the pressure at the output brake, and removing the drive loop 37 to cause the tape advance.

All the logic functions can be easily performed with fluid logic elements using plastic tubing as shown. The timing as indicated above is straightforward, and the action of the input brake is initiated upon receipt of a sprocket output signal $P_S$. A certain delayed time may be added in order to stop the tape at the desired reading position. It should also be obvious that if the right materials are utilized for the piston strips 31, 32, materials which are resilient enough so as to remove the loop 37 without signal pressure $P_D$, then the tubing 36 and the pressure signal $P_D$ are not necessary. Also, if the arrangement is used to drive or position a tape without holes, none of the above piston strips 31, 32 or braking strips 26, 29, would be required.

I have described a pneumatic system for reading and advancing a paper, plastic, or metal based tape. The system described utilized air pressure to force the tape into a predetermined recess in the drive housing. The advantages of this tape drive should now be more obvious, as it eliminates rotating parts and other undesirable features of systems heretofore in use.

I claim:

1. An arrangement for driving a tape, comprising:
- a drive housing having input and output brake cavities, and a predetermined recess located between said cavities;
- a source of pneumatic fluid coupled to each of said cavities and to said recess;
- said tape, under pressure from said recess coupled fluid, is forced into said predetermined recess which is shaped to provide a tape drive loop corresponding to the amount of tape drive;
- said output brake cavity, under pressure from said output cavity fluid, causes the clamping of said tape prior to the formation of said loop, and said input brake cavity under pressure from said input cavity fluid, causes clamping of said tape after formation of said loop; and
- means are included to provide a reflex to said drive loop to facilitate the tape movement.

2. An arrangement according to claim 1, wherein the means for providing a reflex to the tape drive loop include piston strips located above and below said tape, each of said piston strips being fixed at one end.

3. An arrangement according to claim 2, including means for coupling said recess fluid above and below said drive loop.

4. An arrangement according to claim 3, including a strip located in said input and output brakes to provide a smooth surface during passage of said tape through said drive housing, and each of said strips being fixed at one end.

5. An arrangement according to claim 4, including means for reading said tape to produce an output signal indicative of the reading operation, said reading means being located between said input brake and said recess.

6. An arrangement according to claim 5, wherein said tape is a punched tape, and said pneumatic fluid is air which is coupled to said cavities, said recess and reading means.

7. An arrangement according to same claim 6, wherein said reading is performed with fluid logic elements using plastic tube coupling.

8. An arrangement according to claim 6, wherein said strips are Mylar strips.

9. An arrangement according to claim 6, wherein means are included to sense a sprocket hole in said tape, and said input brake to clamp said tape after the sensing of said sprocket hole.

10. An arrangement according to claim 2, wherein said strips are of a sufficiently high stiffness to remove the tape drive loop wihout the application of release pressure being coupled to said recess.

References Cited

UNITED STATES PATENTS

| | | | |
|---|---|---|---|
| 2,816,757 | 12/1957 | Burkhart | 226—95 |
| 3,312,238 | 4/1967 | Voit | 235—201 X |
| 3,314,603 | 4/1967 | Jones | 235—201 |

RICHARD A. SCHACHER, Primary Examiner

U.S. Cl. X.R.

226—113, 121